(12) United States Patent
Ho

(10) Patent No.: US 9,521,931 B2
(45) Date of Patent: Dec. 20, 2016

(54) DETACHABLE SLEEVE

(71) Applicant: Allure Home Creation Co., Inc., Boonton, NJ (US)

(72) Inventor: Edward Ho, Warren, NJ (US)

(73) Assignee: Allure Home Creation Co., Inc., Boonton, NJ (US)

( * ) Notice: Subject to any disclaimer, the term of this patent is extended or adjusted under 35 U.S.C. 154(b) by 0 days.

(21) Appl. No.: 14/196,549

(22) Filed: Mar. 4, 2014

(65) Prior Publication Data

US 2015/0250362 A1    Sep. 10, 2015

(51) Int. Cl.
*B65D 25/28* (2006.01)
*A47J 45/08* (2006.01)
*A47J 36/00* (2006.01)

(52) U.S. Cl.
CPC .............. *A47J 45/085* (2013.01); *B65D 25/28* (2013.01)

(58) Field of Classification Search
CPC .......... A47J 36/00; A47J 37/10; A47J 45/071; A47J 45/07; A47J 45/085

USPC .................. 220/573.1, 573.4, 759, 772, 762, 763, 220/764

See application file for complete search history.

(56) References Cited

U.S. PATENT DOCUMENTS

| | | | |
|---|---|---|---|
| 1,695,724 A * | 12/1928 | Trent | 220/763 |
| 3,157,909 A * | 11/1964 | Schmitt | 220/759 |
| 3,272,547 A * | 9/1966 | Pryce | 294/31.1 |
| 4,577,367 A * | 3/1986 | Durand | 220/759 |
| 5,575,516 A * | 11/1996 | Baumgarten | 292/353 |
| 6,220,477 B1 * | 4/2001 | Schneider | 220/763 |
| 7,028,374 B2 * | 4/2006 | Fiocco | 16/422 |
| 2008/0179211 A1 * | 7/2008 | Kutsch et al. | 206/514 |
| 2009/0193626 A1 * | 8/2009 | Boes | 16/425 |
| 2010/0288783 A1 * | 11/2010 | Park | 220/759 |
| 2014/0158701 A1 * | 6/2014 | Bonnel et al. | 220/759 |

* cited by examiner

*Primary Examiner* — J. Gregory Pickett
*Assistant Examiner* — Niki M Eloshway
(74) *Attorney, Agent, or Firm* — Lowenstein Sandler LLP

(57) ABSTRACT

This application discloses a novel detachable sleeve comprising an elongated body, an internal cavity adapted to receive a handle and a reversible locking mechanism to engage and disengage with the handle when received by the internal cavity.

20 Claims, 9 Drawing Sheets

DETACHABLE SLEEVE

BACKGROUND

During cooking, cookware can be exposed to a wide variety of temperatures. Many times, the temperatures used in preparing food can range beyond what is comfortable or safe for human skin. Cookware is designed to efficiently transfer heat from the cookware to food, specifically at a desired temperature at the desired time.

The type of materials being used to create cookware helps determine how and how well the cookware will transfer heat from the heat source. In many instances, cookware is made of metal that has a high conductivity. A material's conductivity is in part a measure of how well the material is able to transfer heat. For cookware, it is important to consider how well the cookware materials transfers heat in order to provide cooking.

Some materials, such as metal, have high conductivity and are thus favored in the construction of cookware. Among the favored, highly conductive materials are metals, namely copper, aluminum, iron and steel. Less conductive materials, such as glass and ceramics can also utilized in cookware; glass and ceramics are poor conductors, and as such, take longer to heat and cool which is ideal for preparations that require a long, slow cooking time.

During cooking, heat is transferred throughout the cookware to ensure even heat distribution as desired by the chef. Often times this heat distribution will continue throughout conductive materials (like metals) in the cookware, including the handle. A person then touching cookware that has been on the stove or freezer for a prolonged period of time may burn or injure him or herself when touching the cookware.

One remedy to prevent this type of injury is to use some type of protection when touching a hot or cold handle. While objects like a towel or pot holder may be used to insulate a handle, they do not provide a tight grip which could result in the cookware slipping and spilling its contents. Also, since towels and pot holders are used ad hoc to hold on to a handle, the user may feel discomfort from the handle over prolonged use.

While some cookware utilizes plastic handles or handle coverings to prevent injury to the user, these handles limit the use of the cookware. Plastics generally have a melting point lower than oven temperatures, leaving them susceptible to melting if left in the oven and ruining both cookware and oven. This limits the range and scope for the cookware to be used based on the properties of the handle. Likewise, such cookware can be more expensive since it requires additional materials for each individual handle or if more cookware must be purchased in order accommodate all possible uses.

There remains a need to protect a person from being injured from cookware while still providing the needed flexibility in using the cookware for a variety of purposes.

OBJECTS AND SUMMARY

It is an object of certain embodiments of the invention to provide a detachable sleeve.

It is an object of certain embodiments of the invention to provide a detachable sleeve that may be used with various compatible handles.

It is an object of certain embodiments of the invention to provide components for a detachable sleeve that can reversibly engage a handle.

It is an object of certain embodiments of the invention to provide a detachable sleeve that limits motion from the handle when the detachable sleeve is used with the handle.

It is an object of certain embodiments of the invention to provide a detachable sleeve that insulates inserted handles.

It is an object of certain embodiments of the invention to provide a detachable sleeve for comfortable gripping of an inserted handle.

It is an object of certain embodiments of the invention to provide a kit including a detachable sleeve and objects with a compatible handle.

DETAILED DESCRIPTION OF THE INVENTION

Figure 1:
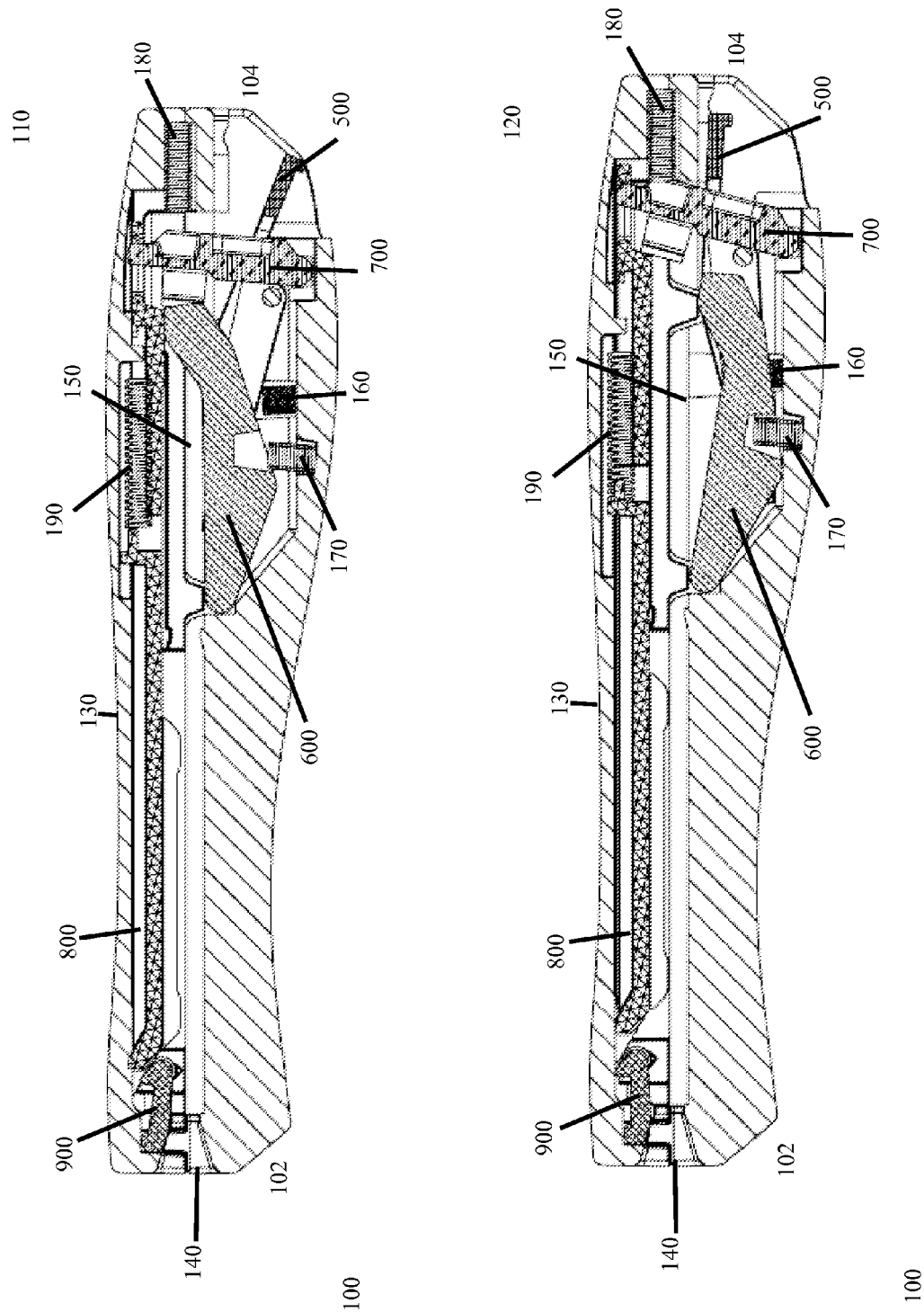
FIG. 1 a cross-section of an embodiment of a detachable sleeve in the locking and non-locking state.

By virtue of the present invention, in one embodiment, is provided a detachable sleeve which includes an elongated body, with an opening at one end of the elongated body with a cavity designed to hold a handle and a reversible locking mechanism.

In some embodiments, the present invention discloses a detachable sleeve that may be used with a variety of handles. In other embodiments, the detachable sleeve may provide protection from varying temperatures the handle may be exposed and provide a more ergonomic design for the user. The invention may also prevent a handle from moving once it is inserted into the detachable sleeve to provide greater support and stability when in use.

The detachable sleeve may be in either a reversibly locking or non-locking state. In some embodiments, the non-locking state occurs when a handle is being inserted into or taken out of the detachable sleeve. In other embodiments, the locking state occurs when the handle has been inserted into the sleeve with minimal movement until being released or when the detachable sleeve is otherwise at rest. Whether the detachable sleeve is in the locking or non-locking state may be controlled by the user of the detachable sleeve who would be engaging the locking or non-locking states.

In some embodiments, whether the detachable sleeve is in the locking or non-locking state is based on the interaction between the varying components. In other embodiments, the user engaging one component may alternate the detachable sleeve from being in the locking or non-locking state. The components themselves may individually and/or collectively help to both receive the inserted handle and to prevent the inserted handle from moving once inserted. Likewise, the components may individually and/or collectively help to remove the handle after it has been inserted into the detachable handle.

The invention may be utilized for a variety of handles. In some embodiments, the handle may be a part of cookware, that may include, but is not limited to, angel food cake pan, baking pan, braising pan, bread loaf pan, broiler pan, buffet server, cake pan, casserole pan, chef's pan, chestnut pan, crepe pan, double boiler, Dutch oven, egg poacher, fondue pot, frying pan, gratiné pan, griddle, grill pan, meatloaf pan, muffin pan, omelet pan, paella pan, pasta pot, pie pan, roasting pan, rondeau, sauce pan, sauce pot, sautéing pan, sauteuse pan, sautoir, sheet pan, skillet, stir-fry pan, stock pot, tart pan or wok. In other embodiments, the handle may come from handles of non-cooking objects which may be inserted into the detachable sleeve. The object may include, but is not limited to, cookware, utensils, hand tools, industrial tools, garden tools, cleaning devices and sports equipment.

In some embodiments, the invention may be compatible for use with a variety of handle materials. These materials may include, but are not limited to, aluminum, anodized aluminum, cast aluminum, beryllium, cadmium, ceramic, chromium, cobalt, copper, enamel, glass, iron, cast iron, lead, molybdenum, magnesium, manganese, nickel, porcelain, silicon, silver, steamer insert, steel, carbon steel, cast steel, stainless steel, tin, titanium, tungsten or mixtures thereof.

The invention may also be utilized in a kit. In some embodiments, this kit may include the detachable sleeve along with one or more objects that have a compatible handle to be inserted into the detachable sleeve. In some embodiments, the detachable sleeve may be used with any of the included objects or any non-kit included objects that have a compatible handle.

FIGS. 1-9 illustrate an embodiment of the detachable sleeve. FIG. 1 demonstrates the detachable sleeve 100, in both the locking state 110 and the non-locking state 120. In one embodiment, the elongated body 130 has an upper housing piece 400 and a lower housing piece 410 to form the exterior of the detachable sleeve 100. Alternatively, the elongated body 130 may be made from a single piece.

The detachable sleeve 100 may be made from a variety of materials, such as heat-resistant materials including, but not limited to, plastic, metal, ceramic, rubber or other like materials. The detachable sleeve 100 and all of the component parts may withstand a variety of temperatures. These temperatures can include from about −40° C. to about 300° C. Alternatively, the detachable sleeve 100 may be coated with a heat-resistant material. In some embodiments, the elongated body 130 may be made from more than one piece, for example, an upper 400 and lower 410 housing piece which may be held together by screws or other fasteners. The elongated body 130 may include ergonomic design features to increase the comfort of using the detachable sleeve 100.

In other embodiments, the elongated body 130 contains a first end 102, which has an opening 140 to allow a handle to be inserted into the detachable sleeve 100. In other embodiments, the detachable sleeve 100 has a cavity 150 running from the first end 102 to the second end 104. This cavity 150 may be designed to receive a handle as well as to hold the reversible locking mechanism 200. In some embodiments, whether a handle may be inserted or removed from the detachable sleeve 100 depends on if the detachable sleeve 100 is in a locking 110 or non-locking 120 state. When the detachable sleeve 100 is in a non-locking state 120, a handle may be inserted and removed from the detachable sleeve 100. When the detachable sleeve 100 is in a locking state 110, a handle is held in place in the detachable sleeve 100 by the reversible locking mechanism 200.

Figure 2:
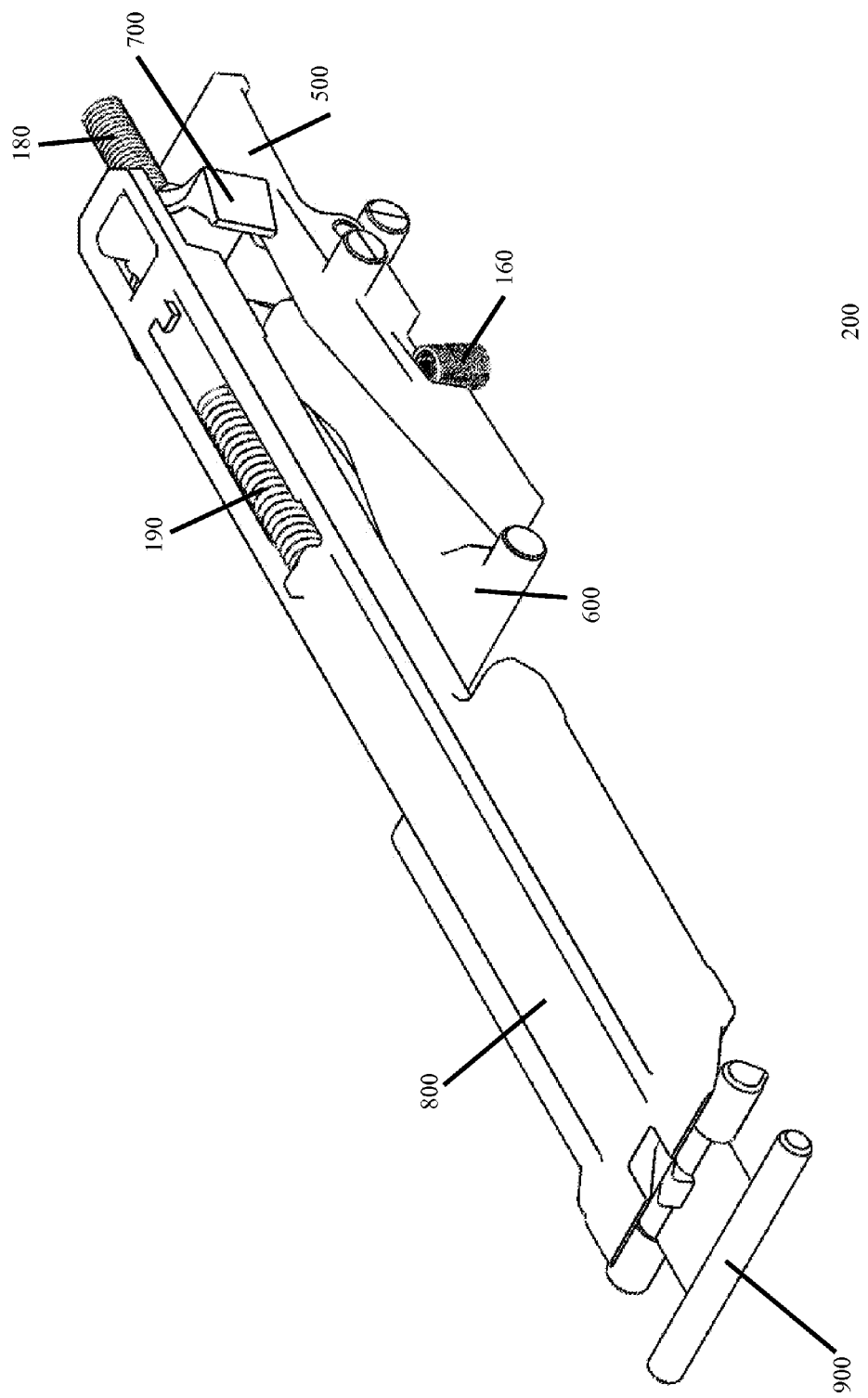
FIG. 2 is a schematic of one embodiment for a reversible locking mechanism, comprising the release lever, latch, hammer, slide and clamp.
Figure 3:
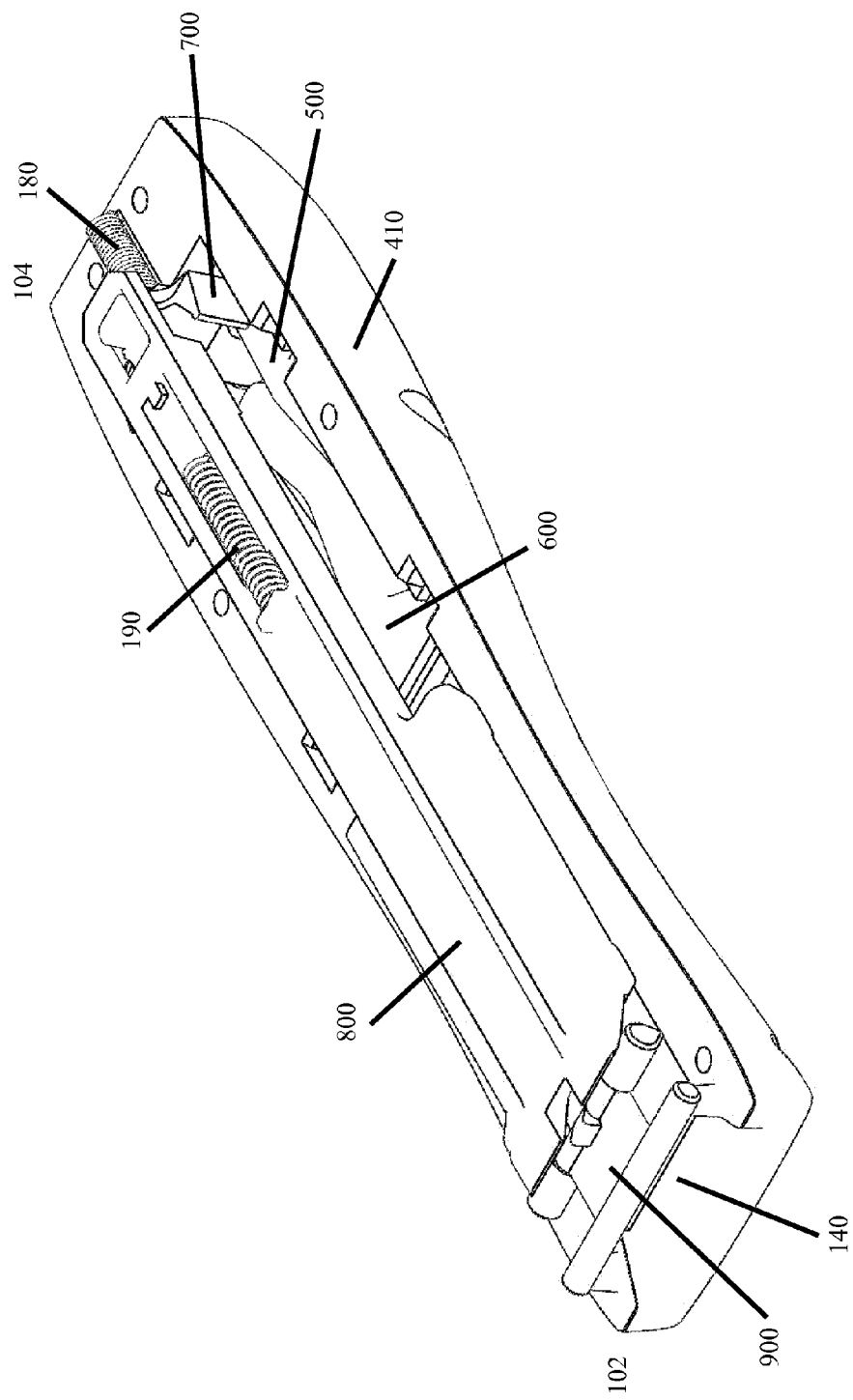
FIG. 3 is a cross-section of an embodiment of the detachable sleeve showing a reversible locking mechanism in the lower housing piece of the elongated body.
Figure 4:
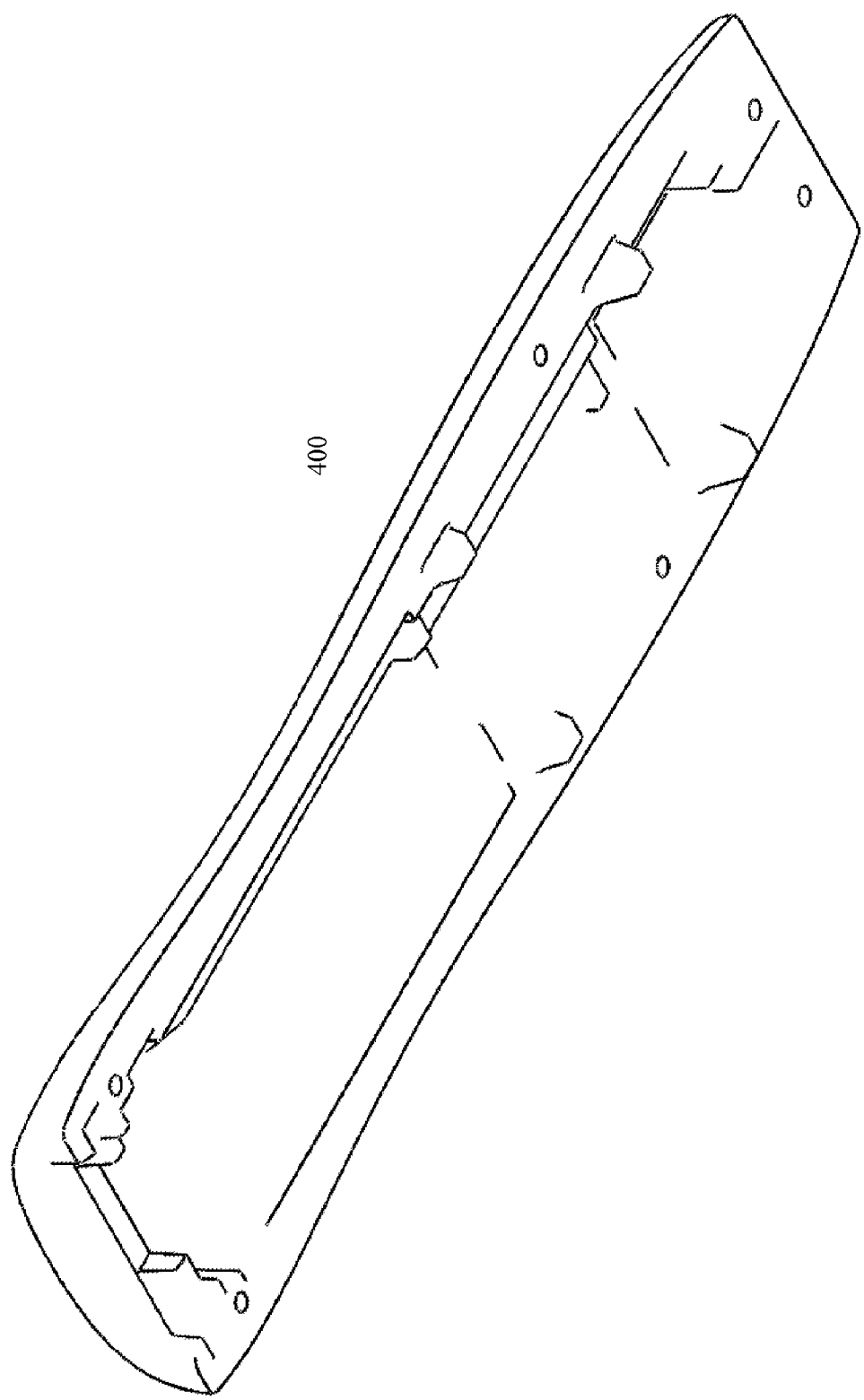
FIG. 4 is a diagram of an embodiment for an upper housing piece for the elongated body in some embodiments.

FIG. 2 illustrates one embodiment of the reversible locking mechanism 200. In some embodiments, the reversible locking mechanism 200 may consist of a release lever 500, a latch 600, a hammer 700, a slide 800 and a clamp 900. The reversible locking mechanism 200 may be partially enclosed within the elongated body 130 and may have the release lever 500 partially exposed. FIG. 3 illustrates an embodiment with the reversible locking mechanism 200 inside the lower housing piece 410. FIG. 4 illustrates one embodiment of the upper housing piece 400. Whether the detachable sleeve 100 is in a locking 110 or non-locking state 120 may be determined by the release lever 500. The locking mechanism components may be made from a variety of materials which may include, but are not limited to plastic, metal, ceramic, rubber or other like materials.

Figure 5:
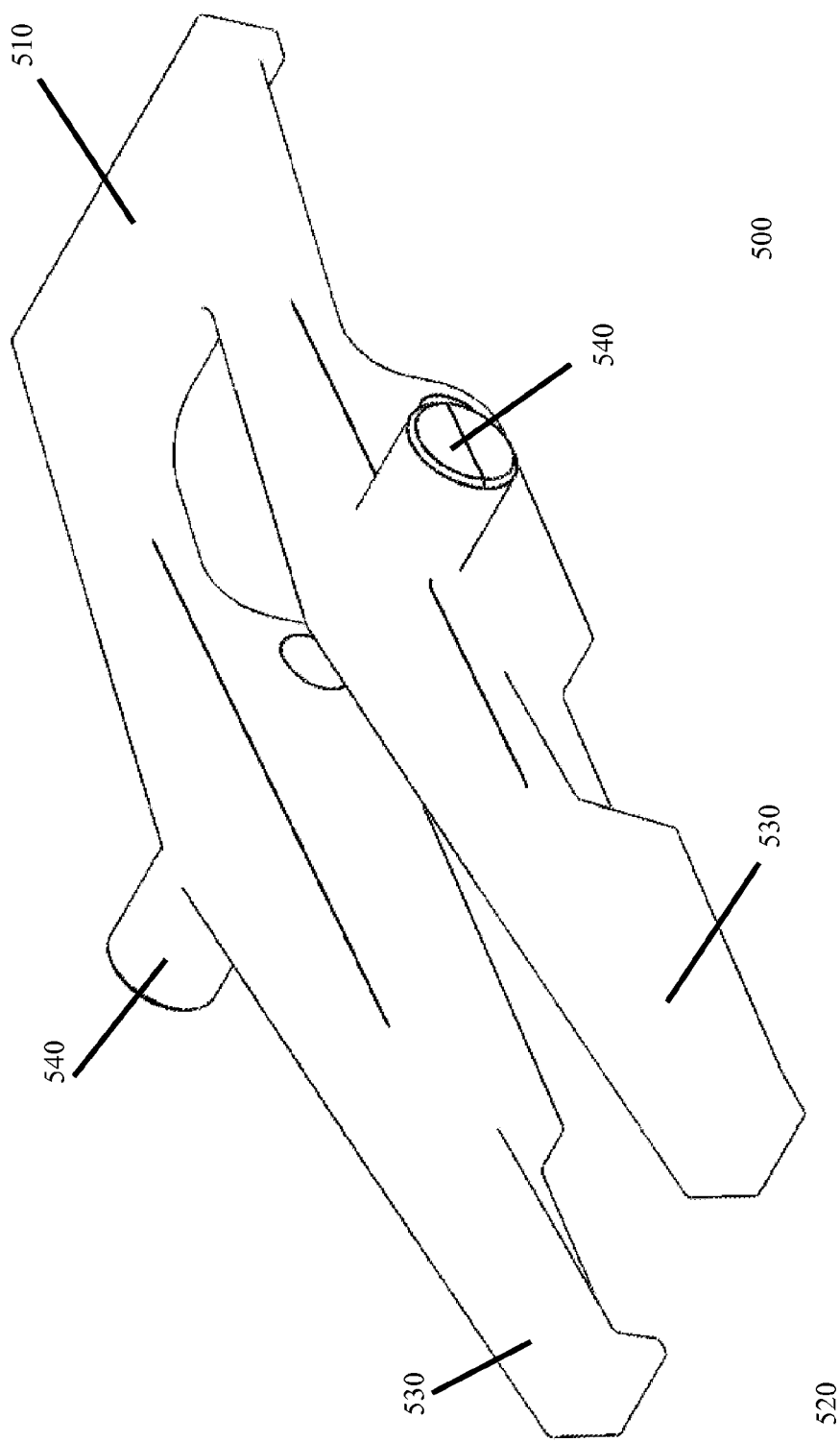
FIG. 5 is an expanded view of an embodiment of the release lever.

FIG. 5 illustrates a magnified view of one embodiment of the release lever 500. In some embodiments, the release lever 500 has a lifting end 510 and a pushing end 520. The pushing end 520 may have two pushing end arms 530. The release lever 500 may also be approximately bisected by two release lever pins 540 or other such axis points which may make contact with the elongated body 130.

In one embodiment, when the lifting end 510 is pulled upward (towards the upper housing piece 400), the detachable sleeve 100 is in the non-locking state 120. When the lifting end 510 is not being engaged, the detachable sleeve 100 is in the locking state 110. In some embodiments, the release lever 500 is held in the locking state 110 by two release lever springs 160 under each of the pushing end arms 530. When the release lever 500 is in the non-locking state 120, the pushing end arms 530 compress the release lever springs 160.

Between the locking 110 and non-locking states 120, the release lever 500 rotates at the release lever pins 530. Due to the force being applied by the release lever 500 when engaged in the non-locking state 120, the release lever 500 may be made from metal in some embodiments.

Figure 6:
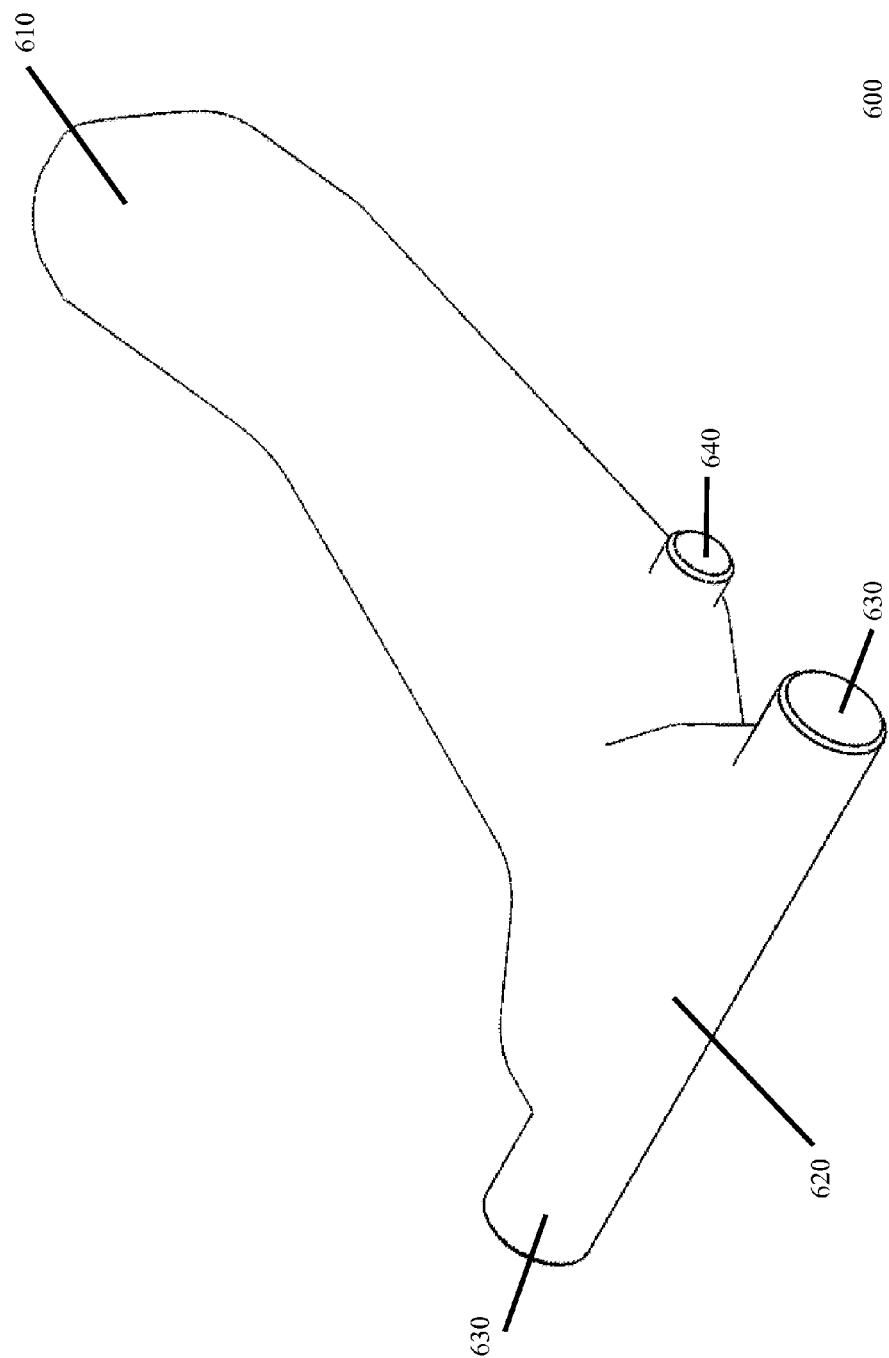
FIG. 6 is an expanded view of an embodiment of the latch.

In some embodiments, when the detachable sleeve 100 engaged in the non-locking state 120, the release lever 500 may engage the latch 600. FIG. 6 illustrates a magnified view of one embodiment of the latch 600. The latch may have a locking end 610 and a pivoting end 620. On the pivoting end 620, there are two latch pins 620 or other like axis points that may contact the elongated body 130. The latch 600 rotates along the latch pins 630 on the pivoting end 620 in between the locking 110 and non-locking states 120. In some embodiments, a latch spring 170 approximately bisects the latch 600 on its bottom. In other embodiments, the latch 600 is held in the locking state 110 by the latch spring 170.

In one embodiment, when the release lever 500 is in the non-locking state 120, the pushing end 520 of the release lever 500 pushes down (towards the lower half of the elongated body 130) to exert force onto the latch rods 640 located on either side of the latch 600. As the pushing end 520 engages the latch rods 640 the latch spring 170 is compressed. The compressed latch spring 170 allows the pivoting end 620 to rotate along the latch pins 630 which permits the locking end 610 to drop towards the lower half of the elongated body 130.

During the locking state 110 in some embodiments, the locking end 610 of the latch 600 engages a handle that is inserted into the detachable sleeve 100. The locking end 610 may make contact with a handle either by pushing the handle up towards the upper half of the elongated body 130 or by inserting the locking end 610 through an aperture at the handle's end. The engagement of the locking end 610 of the latch 600 with the inserted handle reduces the movement of a handle within the detachable sleeve 100 and may help prevent the inserted handle from moving in or slipping from the detachable sleeve 100. When a handle is inserted into the detachable sleeve 100, the latch 600 and the hammer 700 both interact with the end of the handle to prevent the handle from moving within the detachable sleeve 100.

Figure 7:
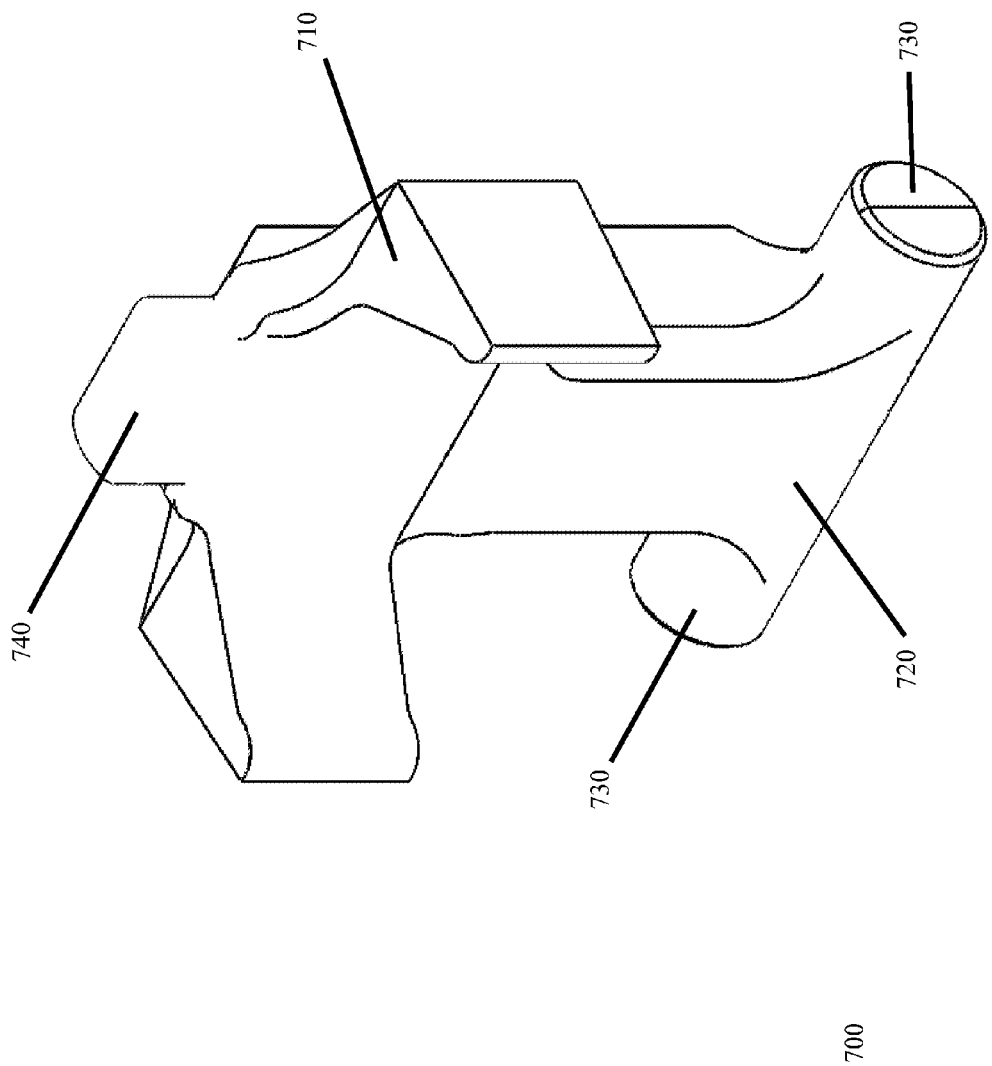
FIG. 7 is an expanded view of an embodiment of the hammer.

FIG. 7 illustrates a magnified view of one embodiment of the hammer 700. In one embodiment, the hammer 700 has a locking end 710 and a pivoting end 720. The pivoting end 720 may also have two hammer pins 730 or other such axis points that allow the hammer 700 to pivot between the locking 100 and non-locking 120 states. In other embodiments, the hammer 700 is held in the locking state 110 by the hammer spring 180.

In the locking state 110, the hammer 700 is pushed towards the first end 102 of the detachable sleeve 100 by the hammer spring 180. The force exerted by the hammer spring 180 helps to prevent movement of a handle inserted into the detachable sleeve 100. As the hammer 700 is being pushed forward by the hammer spring 180, the latch 600 is exerting an upward force on the inserted handle which holds the handle in place. In some embodiments, the locking end 710 of the hammer 700 is designed to receive the end of a handle, further reducing the amount of movement of an inserted handle.

During the non-locking state 120 in some embodiments, as the release lever 500 engages the latch 600, the latch 600 may engage the hammer 700. The locking end 610 of the latch 600 engages the hammer 700 by applying force against the hammer 700 towards the second end 104 of the elongated body 130. This force by the latch 600 compresses the hammer spring 180 which disengages the hammer 700 from the inserted handle and, in part, allows the handle to be removed from the detachable sleeve 100. The locking end 710 of the hammer 700 may also include a slide engager 740 in some embodiments. The slide engager 740 may engage the slide 800 during the non-locking state 120.

Figure 8:
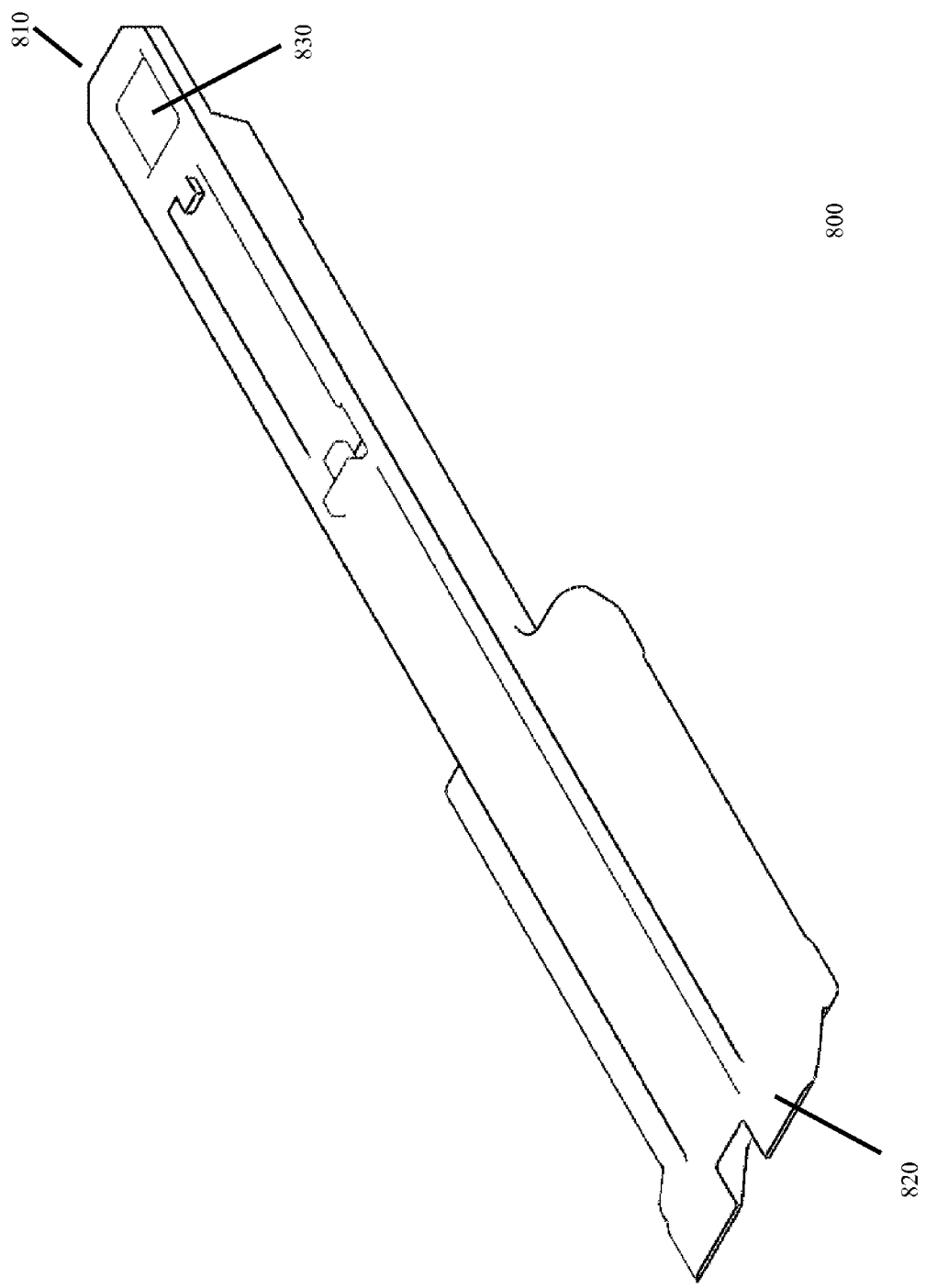
FIG. 8 is an expanded view of an embodiment of the slide.

FIG. 8 illustrates a magnified view of one embodiment of the slide 800. In some embodiments, the slide may have a pushing end 810 and a sloping end 820. The sloping end may include a sloped edge to engage and press against the clamp 900 during the locking state 120. In other embodiments, the slide engager 740 of the hammer 700 may be inserted into the hammer engager 830 in the slide 800. In other embodiments, the slide 800 may be held in the locking state 110 by the slide spring 190.

During the locking state 110 of some embodiments, the slide spring 190 may force to push the slide 800 towards the first end 102 of the detachable sleeve 100. In other embodiments, as the latch 600 pushes against the hammer 700, the slide engager 740 of the hammer 700 may push against the hammer engager 830 of the slide 800 and may push the slide 800 towards the second end 104 of the elongated body 130 during the non-locking state 120. The movement of the hammer 700 against the slide 800 compresses the slide spring 190.

Figure 9:
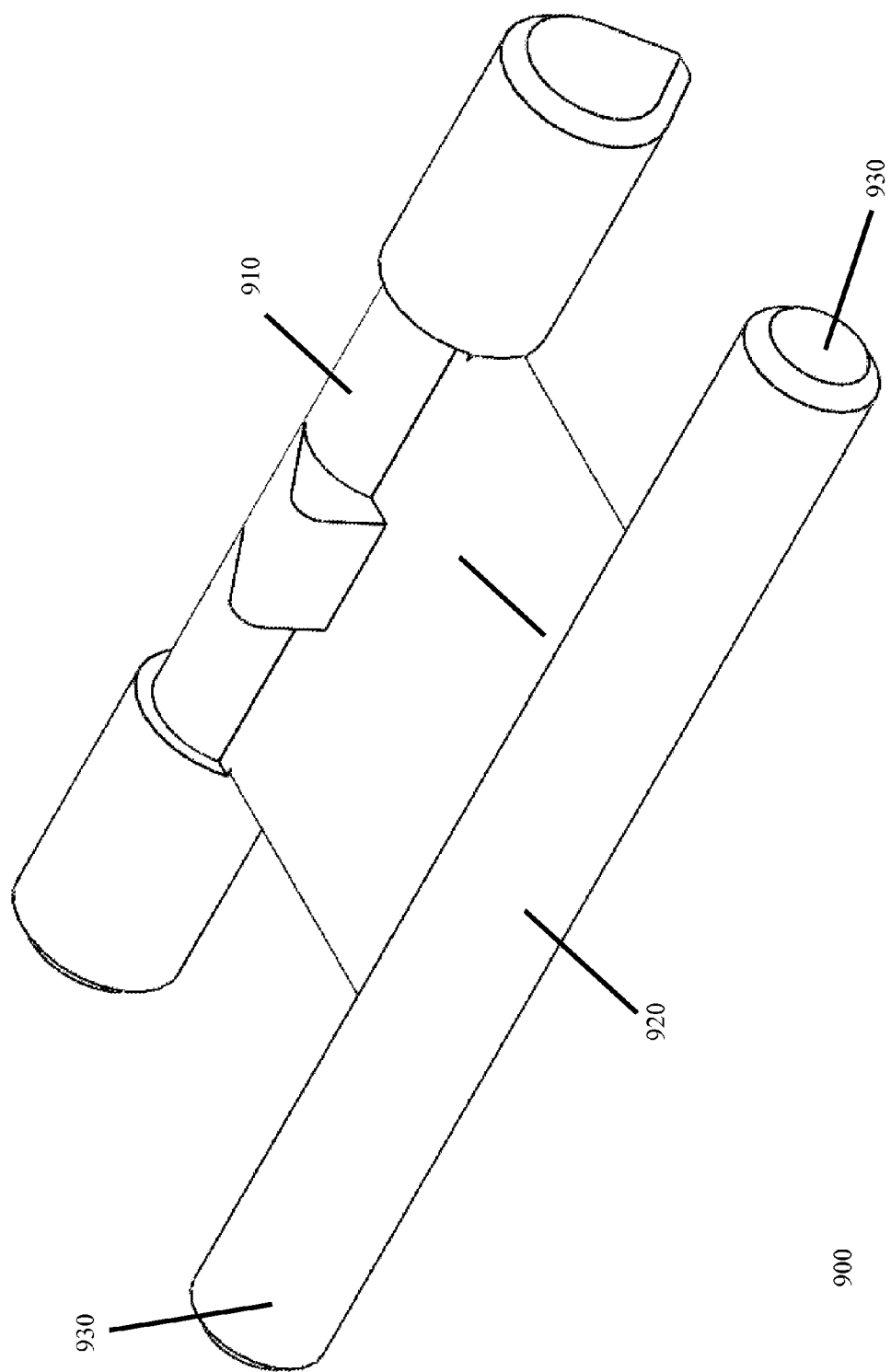
FIG. 9 is an expanded view of an embodiment of the clamp.

The slide 800 may interact with the clamp 900 in some embodiments. FIG. 9 illustrates a magnified view of one embodiment of the clamp 900. In other embodiments, the clamp may have the clamping end 910 and a pivoting end 920. The pivoting end 920 may make contact with upper housing piece 400 through the clamp pins 930. The clamp pins 930 or other such axis points may allow the clamp 900 to pivot between the locking 110 and non-locking 120 states.

During the non-locking state 120, the clamping end 910 moves upward towards the upper half of the elongated body 130. In other embodiments, during the locking state 110, the sloping end 820 of the slide 800 engages the clamping end 910 of the clamp 900 by pressing the clamping end 910 down towards the lower half of the elongated body 130. When the sloping end 820 engages the clamping end 910, the clamping end 910 may press down onto a handle inserted into the detachable sleeve 100. In certain embodiments, the clamping end 910 helps to reduce movement and increase the hold of the inserted handle.

What is claimed is:

1. A detachable sleeve, comprising:
   an elongated body having a first end and a second end;
   a reversible locking mechanism associated with the second end of the elongated body;
   the reversible locking mechanism comprising a hammer and a slide;
   the first end of the elongated body having an opening; and
   an internal cavity running longitudinally from the opening of the first end to the second end of the elongated body, the internal cavity adapted to receive a handle through the first opening and along a longitudinal direction parallel to the slide and perpendicular to the hammer;
   wherein the hammer is adapted to receive an end of the handle;
   wherein the hammer is perpendicular to the slide;
   wherein the reversible locking mechanism is adapted to engage the handle and insulate the handle,
   wherein the reversible locking mechanism comprises:
      a latch comprising a locking end and a pivoting end,
      a release lever comprising a lifting end and a pushing end, and
      a clamp comprising a clamping end and a pivoting end,
   wherein the hammer comprises a locking end and a pivoting end, and
   wherein the slide comprises a pushing end and a sloping end.

2. The detachable sleeve of claim 1, wherein the reversible locking mechanism is at least partially enclosed in the elongated body.

3. The detachable sleeve of claim 2, wherein the elongated body comprises an upper housing piece and a lower housing piece.

4. The detachable sleeve of claim 2, wherein the detachable sleeve comprises a heat-resistant material.

5. The detachable sleeve of claim 1, wherein the detachable sleeve can be in a locking or in a non-locking state.

6. The detachable sleeve of claim 1, wherein the non-locking state occurs when the lifting end of the release lever is engaged.

7. The detachable sleeve of claim 1, wherein the pushing end of the release lever presses down on the pivoting end of the latch during the non-locking state.

8. The detachable sleeve of claim 7, wherein the locking end of the latch prevents the handle from moving when in the locking state.

9. The detachable sleeve of claim 1, wherein the locking end of the hammer is designed to receive the end of the handle.

10. The detachable sleeve of claim 1, wherein the latch and the hammer prevent the handle from moving during the locking state.

11. The detachable sleeve of claim 10, wherein the locking end of the latch engages the hammer during the non-locking state.

12. The detachable sleeve of claim 1, wherein the locking end of the hammer engages the pushing end of the slide during the non-locking state.

13. The detachable sleeve of claim 1, wherein the sloping end of the slide engages the clamping end of the clamp during the locking state.

14. The detachable sleeve of claim 1, wherein the locking end of the clamp engages the handle during the locking state.

15. A kit comprising the detachable sleeve of claim 1; and cookware with a handle that can be inserted into the detachable sleeve.

16. The detachable sleeve of claim 1, wherein the handle may be part of cookware, utensils, hand tools, industrial tools, garden tools, cleaning devices and sports equipment.

17. The detachable sleeve of claim 16, wherein the cookware comprises angel food cake pan, baking pan, braising pan, bread loaf pan, broiler pan, buffet server, cake pan, casserole pan, chef's pan, chestnut pan, crepe pan, double boiler, dutch oven, egg poacher, fondue pot, frying pan, gratiné, griddle, grill pan, meatloaf pan, muffin pan, omelet pan, paella pan, pasta pot, pie pan, roasting pan, rondeau, sauce pan, sauce pot, sautéing pan, sauteuse pan, sautoir, sheet pan, skillet, stir-fry pan, stock pot, tart pan or wok.

18. The detachable sleeve of claim 1, wherein the handle comprises plastic, aluminum, anodized aluminum, cast aluminum, beryllium, cadmium, ceramic, chromium, cobalt, copper, enamel, glass, iron, cast iron, lead, molybdenum, magnesium, manganese, nickel, porcelain, silicon, silver, steamer insert, steel, carbon steel, stainless steel, tin, titanium, tungsten, or mixtures thereof.

19. The detachable sleeve of claim 1, comprising heat-resistant materials able to withstand temperatures ranging from about −40° C. to about 300° C.

20. The detachable sleeve of claim 19, wherein the heat-resistant materials comprise plastic, metal, ceramic, or rubber.

* * * * *